United States Patent
Daveze et al.

(10) Patent No.: US 7,990,285 B2
(45) Date of Patent: Aug. 2, 2011

(54) METHOD AND DEVICE FOR AUDIBLE WARNING WHEN AN AIRCRAFT AUTOPILOT IS DEACTIVATED

(75) Inventors: Fabien Daveze, Toulouse (FR); Christel Ravier, Tournefeuille (FR); Pierre Campagne, Toulouse (FR)

(73) Assignee: Airbus France, Toulouse (FR)

( * ) Notice: Subject to any disclaimer, the term of this patent is extended or adjusted under 35 U.S.C. 154(b) by 920 days.

(21) Appl. No.: 11/722,433

(22) PCT Filed: Dec. 19, 2005

(86) PCT No.: PCT/EP2005/013642
§ 371 (c)(1),
(2), (4) Date: Jun. 21, 2007

(87) PCT Pub. No.: WO2006/072387
PCT Pub. Date: Jul. 13, 2006

(65) Prior Publication Data
US 2010/0045486 A1  Feb. 25, 2010

(30) Foreign Application Priority Data
Jan. 3, 2005 (FR) ..................................... 05 00008

(51) Int. Cl.
*G08B 23/00* (2006.01)
(52) U.S. Cl. ...................... 340/963; 340/474; 701/11
(58) Field of Classification Search .................. 340/963, 340/945, 952, 474; 701/11, 12
See application file for complete search history.

(56) References Cited

U.S. PATENT DOCUMENTS

| 3,683,346 | A | * | 8/1972 | Horton ........................... 340/528 |
| 4,237,448 | A | | 12/1980 | Weinberg et al. |
| 5,170,163 | A | * | 12/1992 | Collins et al. ................. 340/967 |
| 5,712,623 | A | * | 1/1998 | Kumai et al. ................. 340/565 |
| 6,667,686 | B2 | * | 12/2003 | Talbot ........................... 340/433 |
| 7,088,264 | B2 | * | 8/2006 | Riley ............................. 340/963 |
| 2003/0222782 | A1 | | 12/2003 | Gaudreau |

FOREIGN PATENT DOCUMENTS
GB  897627  5/1962

OTHER PUBLICATIONS
International Search Report dated Mar. 6, 2006.
* cited by examiner

*Primary Examiner* — George A Bugg
*Assistant Examiner* — Edny Labbees
(74) *Attorney, Agent, or Firm* — Dickinson Wright PLLC

(57) ABSTRACT

The invention relates to a method for producing an audible warning when an aircraft autopilot is deactivated. The method includes a) transmitting a first sound in the aircraft cockpit during a time ranging from a first predetermined value and a second predetermined value and b) transmitting a second sound in the aircraft cockpit. The invention also relates to an audible warning device having a monitoring unit for monitoring the deactivation of the aircraft autopilot and an activation unit for emitting an audible warning in the cockpit, where the activation unit is constructed such that it activates the first sound emission whose length ranges from the first predetermined value and a second predetermined value and a second sound when the monitoring unit detects the deactivation of the autopilot.

8 Claims, 4 Drawing Sheets

METHOD AND DEVICE FOR AUDIBLE WARNING WHEN AN AIRCRAFT AUTOPILOT IS DEACTIVATED

TECHNICAL FIELD OF THE INVENTION

The subject of the invention is a method for producing an audible warning when an aircraft autopilot is deactivated. Another subject of the invention is an aircraft comprising an autopilot capable of being deactivated with implementation of this audible warning method. The invention also relates to an aircraft audible warning device able to emit an audible warning when an autopilot of this aircraft is deactivated, and to an aircraft comprising such a device.

BACKGROUND OF THE INVENTION

Most aircraft, particularly civilian transport airplanes, comprise an autopilot allowing the aircraft to be flown automatically without action on the part of the pilot, for example during phases of cruising flight. The pilot is thus relieved from his flying tasks during these phases of cruising flight which may last for several hours on long-haul flights. When he so wishes, the pilot can deactivate the autopilot in order to take back control of the aircraft himself. The pilot generally has a button that he can press in order to deactivate the autopilot. In the case of airplanes of the Airbus A320, A330, A340 etc. type, this button is located on the mini-stick used for controlling the movements of the airplane. There are also circumstances in which the autopilot is deactivated, independently of the pilot's volition (autopilot fault etc.) or without the autopilot deactivation button being pressed (in the event of action on the rudder pedals, action on the mini-stick, etc.). In all cases, a warning is activated in the cockpit in order to alert the pilot to the fact that the autopilot has been deactivated, in case this deactivation was unintentional or not instigated by the pilot, and has passed unnoticed. This warning is generally made up of visual warnings (the displaying of text messages and the activation of warning lights) and of an audible warning.

However, this audible warning may distract the pilot in his activities, particularly when the autopilot has been deactivated deliberately at the pilot's initiative by pressing said button. In order to stop this audible warning from being emitted in the cockpit, the pilot can acknowledge it by pressing said button. The pilot is therefore asked to acknowledge this audible warning by pressing this button a second time if the autopilot has been deactivated deliberately or by pressing this same button for a first time if the autopilot has been deactivated unintentionally or not at the instigation of the pilot. This method of operation has the disadvantage that if the autopilot has been deactivated because the pilot has unintentionally pressed said autopilot deactivation button twice, no audible warning is emitted in the cockpit. In such a case, the pilot may be unaware that said autopilot has been deactivated, and this may be detrimental to the flight of the aircraft.

These problems are solved, at least in part, according to the invention by a method for producing an audible warning when an aircraft autopilot is deactivated. This method is noteworthy, in that it involves the following steps:
 a) emitting a first sound in the cockpit of the aircraft for a period of time ranging between a first predetermined value and a second predetermined value;
 b) emitting a second sound in the cockpit of the aircraft.

In this way, because the first sound is emitted for a minimum length of time corresponding to said first predetermined value, an audible warning is emitted in the cockpit irrespective of the circumstances in which the autopilot was deactivated, particularly even if this deactivation is the result of the deactivation button being pressed twice unintentionally. This allows the pilots of the aircraft to be better aware of this warning (and therefore of the fact that the autopilot has been deactivated).

SUMMARY OF THE INVENTION

In a preferred embodiment of the invention, the acoustic intensity corresponding to the second sound is greater than the acoustic intensity corresponding to the first sound. This has the advantage that while the first sound is being emitted, the audible warning is not as distracting to the pilots of the aircraft as it is when the second sound is being emitted. In addition, emission of the second sound has the effect of drawing the pilots' attention more closely to the audible warning.

Advantageously emission of the first sound, in step a) is sustained for a period of time corresponding to said first predetermined value if said audible warning is acknowledged by a pilot of the aircraft during said period of time. Thus, the period of time for which the first sound is emitted therefore corresponds to said minimum period of time so that the audible warning causes the pilots the least possible amount of distraction.

Advantageously also, if a pilot of the aircraft acknowledges the audible warning, then the emission of the second sound is canceled. In this way, if acknowledgement is received while the first sound is being emitted, the second sound is not emitted and the audible warning therefore distracts the pilots as little as possible. If the audible warning is not acknowledged while the first sound is being emitted, the second sound is emitted. In the preferred embodiment whereby the acoustic intensity of the second sound is greater than that of the first sound, emission of the second sound has the effect of attracting the pilots' attention more closely to this audible warning and therefore of allowing the pilots to be better aware that the autopilot has been deactivated. If a pilot then acknowledges this audible warning, emission of the second sound is canceled following this acknowledgement.

The invention also relates an aircraft comprising an autopilot capable of being deactivated with implementation of an audible warning method as aforementioned.

The invention also relates to an aircraft audible warning device comprising first means for monitoring deactivation of an autopilot of this aircraft and second means for activating the emission of an audible warning in the cockpit. This device is notable in that said second means are able to activate emission of a first sound for a period of time comprised between a first predetermined value and a second predetermined value followed by a second sound when said first means detect deactivation of the autopilot.

In a preferred embodiment, this audible warning device further comprises third means for acquiring information concerning the acknowledgement of said audible warning, said second means being able to cancel the emission of the second sound when the third means detect that the audible warning has been acknowledged.

The invention also relates to an aircraft comprising an audible warning device as aforementioned.

BRIEF DESCRIPTION OF THE DRAWINGS

The invention will be better understood from reading the description which follows and from examining the attached figures. In these figures, identical references denote elements which are similar.

DETAILED DESCRIPTION OF THE INVENTION

Figure 1:
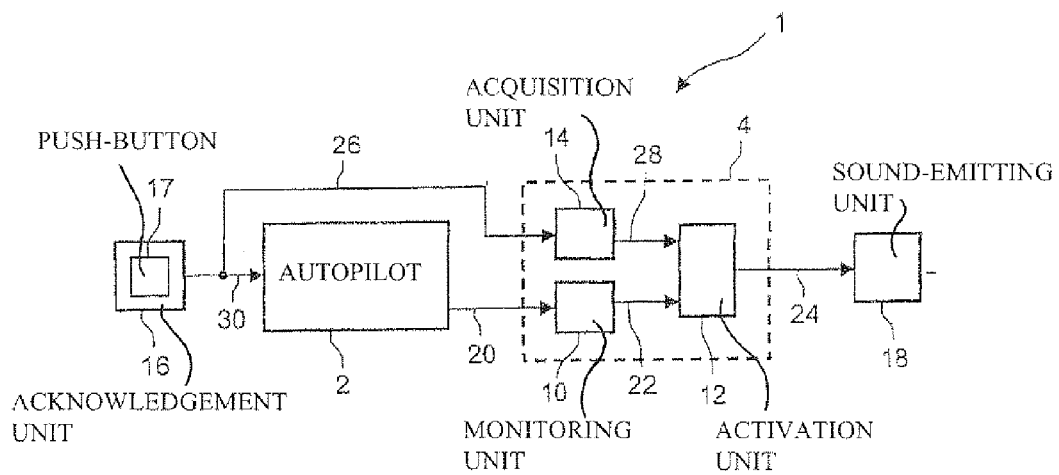
FIG. 1 is a block diagram of an audible warning device according to the invention.

In a preferred embodiment depicted in FIG. 1, the aircraft audible warning device 1 according to the invention comprises first means 10 for monitoring deactivation of an autopilot of this aircraft and second means 12 for activating emission of an audible warning in the cockpit. The first means 10 are connected to an autopilot 2 of the aircraft by a link 20. The autopilot 2 communicates its activated/deactivated status to these first means 10 by way of this link 20. This link may, for example, be a digital data link. These first means 10 monitor the status of the automatic pilot and when they detect a change from the activated status to the deactivated status, they inform the second means 12 of this, for example by a link 22.

Figure 2:
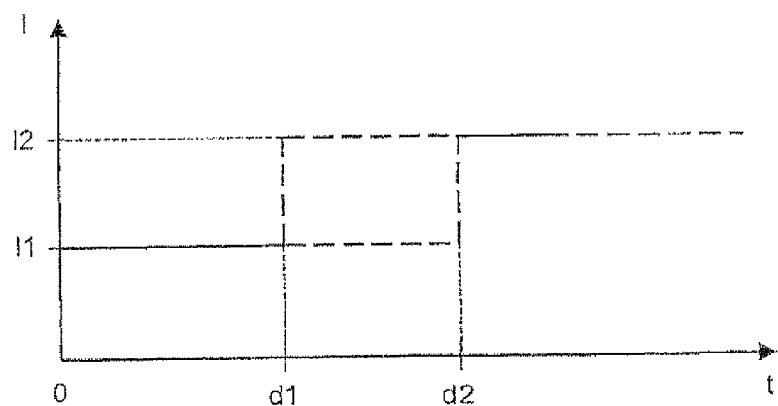
FIG. 2 is a timing sequence illustrating the acoustic intensity I of a sound emitted in the cockpit of the aircraft as a function of time t, when an audible warning is emitted as a result of the autopilot being deactivated.

When the second means 12 receive, from the first means 10, the information that the autopilot 2 has switched from the activated state to the deactivated state, they activate emission of a first sound of acoustic intensity I1, at an instant t=0 as depicted in FIG. 2. To do that, these second means are connected by link 24 to means 18 for emitting sound into the cockpit. Preferably, the latter means comprise at least a loudspeaker. The second means 12 keep this first sound activated for a period of time comprised between a first predetermined value d1 and a second predetermined value d2. Once this period of time has elapsed, if the audible warning has not been acknowledged (as indicated below), the second means 12 deactivate said first sound and activate the emission, via the sound-emitting means 18, of a second sound the acoustic intensity I2 of which is greater than the acoustic intensity I1 of the first sound.

The values of the acoustic intensity in the cockpit I1 and I2 are chosen so that a first sound of acoustic intensity I1 is sufficiently audible in the cockpit over the ambient noise in this cockpit without, however, distracting the pilots and so that a second sound of acoustic intensity I2 attracts the pilots' attention more than the first sound, so as to urge them to react to the audible warning (by acknowledging this warning), thereby becoming aware that the autopilot has been deactivated.

Figure 3:
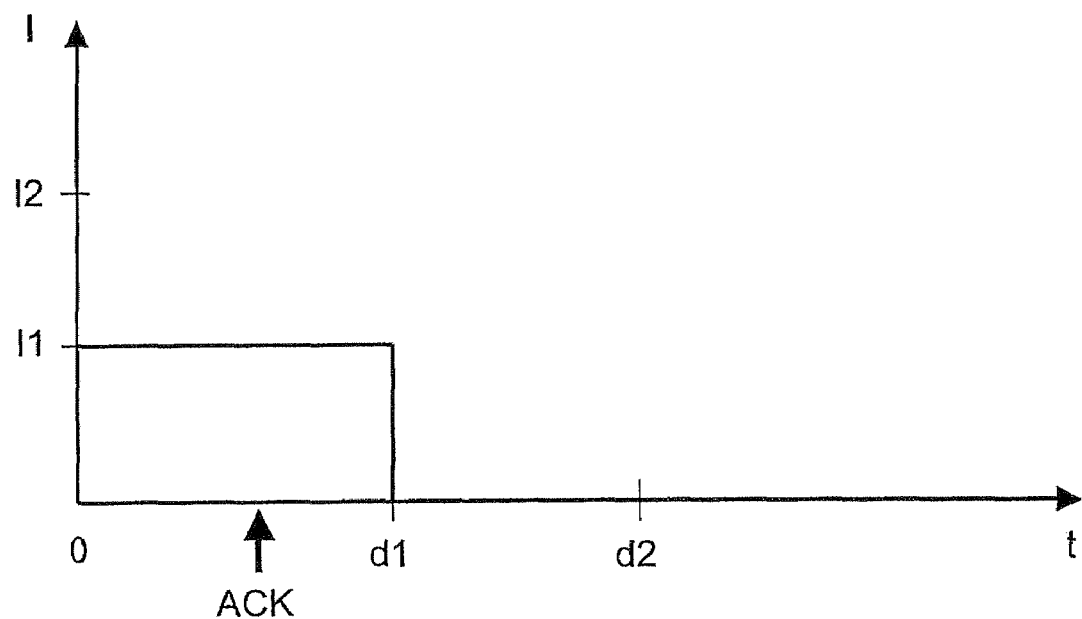
FIGS. 3 to 6 depict timing sequences similar to that of FIG. 2 corresponding to different situations regarding acknowledgement of the audible warning.
Figure 4:
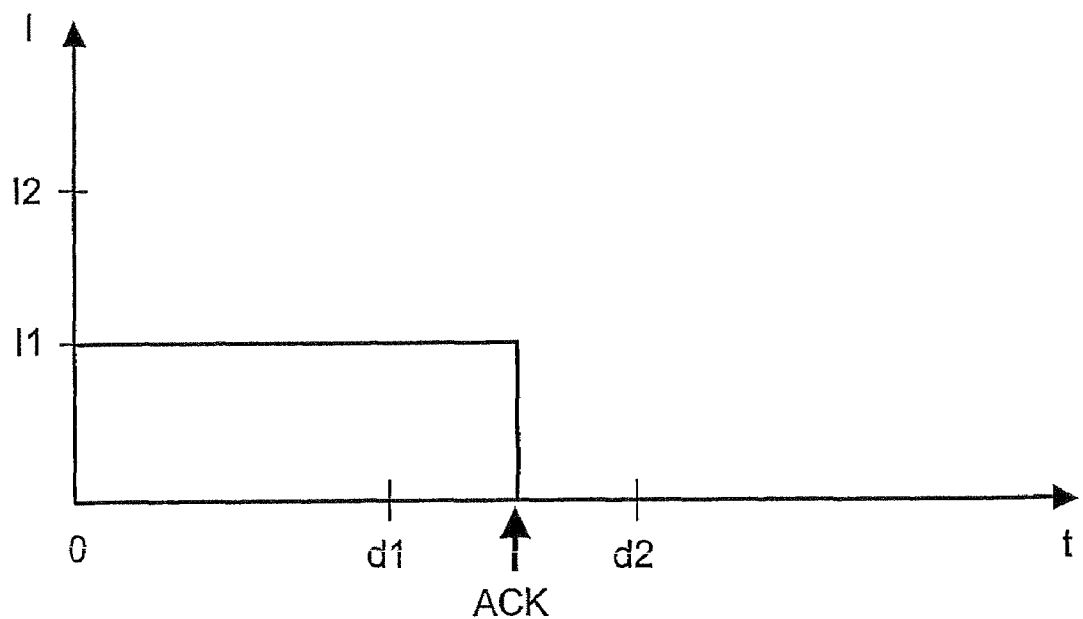
Figure 5:
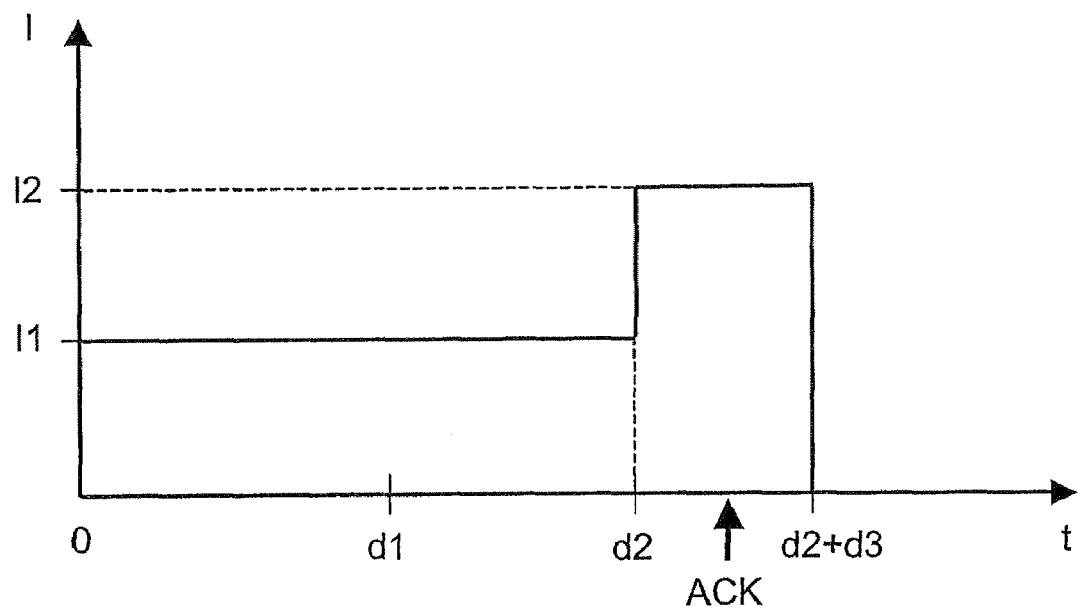
Figure 6:
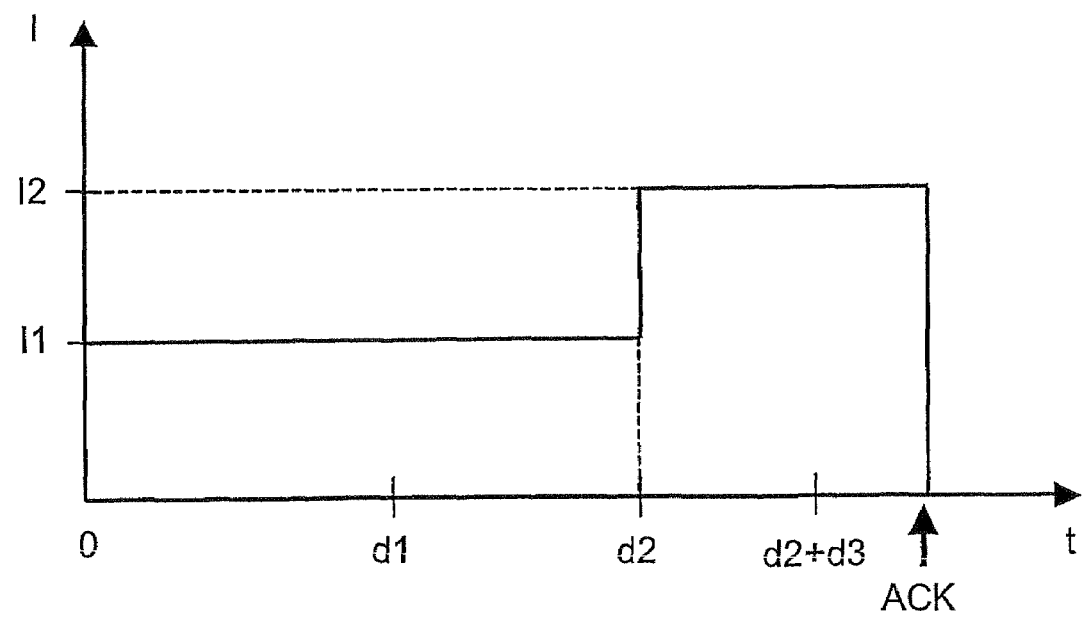

The audible warning device 1 further comprises third means 14 for acquiring information regarding acknowledgement of the audible warning. These third means 14 are connected by a link 26 to means 16 of acknowledging this audible warning. These means advantageously comprise a push-button 17. Preferably, this push-button is situated on the stick or mini-stick (depending on the type of aircraft) used to control the movements of the aircraft. In this case, it is advantageously the same as the push-button used to deactivate the autopilot 2, the acknowledgement means 16 then also being connected to said autopilot 2 by a link 30. When the third means 14 detect that the push-button 17 of the acknowledgement means 16 has been pressed, they send acknowledgement information to the second means 12, for example by a link 28. If the second means receive this acknowledgement information while they are in a state in which they activate emission of a first or of a second sound, they acknowledge this acknowledgement information in order to deactivate emission of this sound as specified hereinafter:

When acknowledgement ACK of the audible warning occurs before the end of the period of time d1, the second means 12 maintain the activation of said first sound until the end of this period of time d1 then deactivate this first sound as depicted in FIG. 3. In this case, emission of the second sound is not activated;

When acknowledgement ACK of the audible warning occurs after the end of the period of time d1 and before the end of the period of time d2, the second means 12 deactivate the first sound more or less as soon as this acknowledgement is given, as depicted in FIG. 4. In this case emission of the second sound is not activated;

When no acknowledgement has been received by the end of the period of time d2, the second means 12 deactivate emission of the first sound and activate emission of the second sound from the end of the period of time d2 onward. In this case:

according to a first variant, when acknowledgement of the audible warning occurs after the end of said period of time d2, the second means deactivate this second sound more or less as soon as this acknowledgement is given;

according to second variant, this second sound is sustained for at least a third predetermined length of time d3 from the end of the period of time d2. Thus, when an acknowledgement ACK of the audible warning occurs before the end of said period of time d3, the second means 12 maintain activation of said second sound until the end of this period of time d3 then deactivate this second sound as depicted in FIG. 5. When acknowledgement ACK of the audible warning occurs after the end of the period of time d3, the second means 12 deactivate this second sound more or less as soon as this acknowledgement is given, as depicted in FIG. 6.

In a preferred embodiment of the invention, the first predetermined period of time d1 is more or less equal to 400 ms, the second predetermined period of time d2 is more or less equal to 800 ms and the third predetermined period of time d3 is more or less equal to 400 ms.

Figure 7:
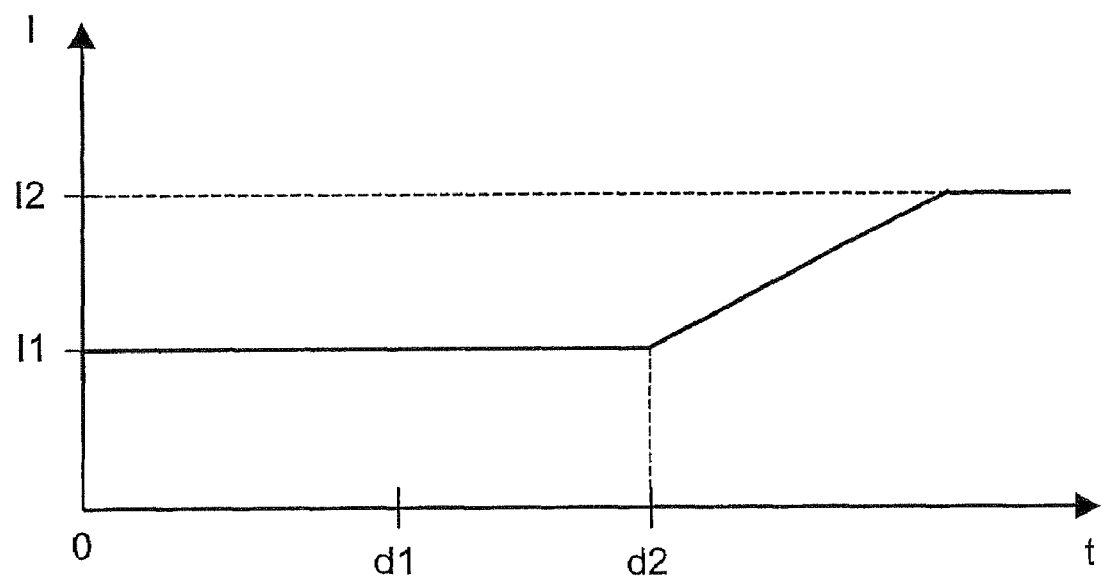
FIG. 7 depicts a timing sequence similar to that of FIG. 2, corresponding to a variant of the invention.

According to a variant of the invention, the value of the acoustic intensity corresponding to the second sound varies gradually from the value I1 of the acoustic intensity corresponding to the first sound (at a moment corresponding to the period of time d2) up to a predetermined maximum value I2 as depicted in FIG. 7. The acknowledgement method for its part is identical to the one described previously.

The invention claimed is:

1. A method for producing an audible warning in an aircraft when an aircraft autopilot is deactivated, the audible warning comprising a first sound and a second sound, and the aircraft having a button that is used as an autopilot deactivation button a pilot can press to deactivate the aircraft autopilot and as an acknowledgement button said pilot can press to acknowledge the audible warning, said method comprising:

a) emitting the first sound in a cockpit of the aircraft for a period of time ranging between a first predetermined value and a second predetermined value when information that the aircraft autopilot has switched from an activated state to the deactivated state is received; and b) emitting the second sound in the cockpit of the aircraft, the acknowledgement of the audible warning by the pilot of the aircraft being taken into account, such that:

if the audible warning is acknowledged by the pilot of the aircraft during a period of time corresponding to said first predetermined value, the emission of the first sound is sustained for a period of time corresponding to said first predetermined value, then the emission of said first sound is deactivated and the emission of said second sound is not activated;

if the audible warning is acknowledged by the pilot of the aircraft at a moment that corresponds to the first sound having lasted for a period of time comprised between said first predetermined value and said second predetermined value, the emission of said first sound is canceled;

if the audible warning is not acknowledged by the pilot of the aircraft during a period of time corresponding to said second predetermined value, the emission of said second sound is activated;

if the audible warning is not acknowledged by the pilot of the aircraft while the first sound is being emitted, then a period of time for which the second sound is emitted is at least equal to a third predetermined value; and if the pilot of the aircraft acknowledges the audible warning, then the emission of said second sound is canceled.

2. The method as claimed in claim 1, wherein a first acoustic intensity corresponding to the second sound is greater than a second acoustic intensity corresponding to the first sound.

3. The method as claimed in claim 2, wherein a value of the second acoustic intensity corresponding to the second sound is equal to a predetermined value.

4. The method as claimed in claim 2, wherein a value of the second acoustic intensity corresponding to the second sound varies gradually from a value of the first acoustic intensity corresponding to the first sound up to a predetermined maximum value.

5. An aircraft comprising an autopilot configured to be deactivated with implementation of an audible warning method as claimed in claim 1.

6. An audible warning device for an aircraft, comprising:
a button used by a pilot of the aircraft for autopilot deactivation to deactivate the aircraft autopilot and as an acknowledgement button to acknowledge an audible warning comprising a first sound and a second sound;
a monitoring unit monitoring deactivation of the autopilot of the aircraft; and
an activation unit activating emission of the audible warning in a cockpit, wherein
when information that the aircraft autopilot has switched from the activated state to the deactivated state is received, said activation unit activates emission of the first sound for a period of time between a first predetermined value and a second predetermined value followed by the second sound when said monitoring unit detects deactivation of the autopilot, the acknowledgement of the audible warning by the pilot of the aircraft being taken into account such that:

if the audible warning is acknowledged by the pilot of the aircraft during a period of time corresponding to said first predetermined value, the emission of the first sound is sustained for a period of time corresponding to said first predetermined value, then the emission of said first sound is deactivated and the emission of said second sound is not activated;

if the audible warning is acknowledged by the pilot of the aircraft at a moment that corresponds to the first sound having lasted for a period of time comprised between said first predetermined value and said second predetermined value, the emission of said first sound is canceled;

if the audible warning is not acknowledged by the pilot of the aircraft during a period of time corresponding to said second predetermined value, the emission of said second sound is activated;

if the audible warning is not acknowledged by the pilot of the aircraft while the first sound is being emitted, then a period of time for which the second sound is emitted is at least equal to a third predetermined value; and if the pilot of the aircraft acknowledges the audible warning, then the emission of said second sound is canceled.

7. The device as claimed in claim 6, further comprising an acquisition unit acquiring information concerning an acknowledgment of said audible warning, said activation unit configured to cancel the emission of the second sound when the acquisition unit detects that the audible warning has been acknowledged.

8. An aircraft, comprising an audible warning device as claimed in claim 6.

* * * * *